United States Patent [19]
Higasihara et al.

[11] Patent Number: 5,273,598
[45] Date of Patent: Dec. 28, 1993

[54] OPTICAL DISC MANUFACTURING METHOD

[75] Inventors: Toshio Higasihara, Kitasoma; Ken Yoshizawa, Tsukuba; Masahiro Suzuki, Kitasoma; Akira Gotoh; Yoshitane Tsuburaya, both of Torite, all of Japan

[73] Assignee: Hitachi Maxell, Ltd., Ibaraki, Japan

[21] Appl. No.: 928,662

[22] Filed: Aug. 17, 1992

Related U.S. Application Data

[60] Continuation of Ser. No. 454,440, Dec. 21, 1989, abandoned, which is a division of Ser. No. 122,186, Nov. 18, 1987, Pat. No. 4,911,968, which is a continuation-in-part of Ser. No. 830,199, Feb. 18, 1986, abandoned.

[30] Foreign Application Priority Data

Feb. 18, 1985 [JP] Japan ................................ 60-28221
Mar. 18, 1985 [JP] Japan ................................ 60-52369

[51] Int. Cl.$^5$ ........................ B32B 31/00; G11B 5/82; G11B 5/84
[52] U.S. Cl. .................. 156/102; 156/273.3; 156/275.7; 156/275.5; 264/1.4; 360/135; 369/282; 369/286
[58] Field of Search .......................... 264/107, 1.4, 106; 428/65; 369/282, 281, 286; 156/102, 581, 272.2, 273.3, 275.3, 275.7, 275.5; 360/135

[56] References Cited

U.S. PATENT DOCUMENTS

| | | | |
|---|---|---|---|
| 3,584,094 | 6/1971 | Rock et al. | 264/107 |
| 3,801,476 | 4/1974 | Roschmann et al. | 369/282 |
| 4,021,897 | 5/1977 | Fisli | 156/275.5 X |
| 4,170,688 | 10/1979 | Roentgen et al. | 156/89 X |
| 4,342,553 | 8/1982 | Graff et al. | 156/325 X |
| 4,452,748 | 6/1984 | Lange et al. | 264/107 |
| 4,503,094 | 3/1985 | Breuninger et al. | 427/250 |
| 4,555,716 | 11/1985 | Odawara et al. | 346/137 |
| 4,616,238 | 10/1986 | Tani et al. | 346/137 |
| 4,686,543 | 8/1987 | Tani et al. | 346/137 |
| 4,710,913 | 12/1987 | Matsushima et al. | 430/945 |

FOREIGN PATENT DOCUMENTS

| | | |
|---|---|---|
| 0049813 | 4/1982 | European Pat. Off. |
| 0109245 | 5/1984 | European Pat. Off. |
| 2721334 | 12/1977 | Fed. Rep. of Germany |
| 2624375 | 4/1978 | Fed. Rep. of Germany |
| 56-139940 | 10/1981 | Japan |
| 61-48143 | 8/1986 | Japan |
| 2087129 | 5/1982 | United Kingdom |

OTHER PUBLICATIONS

"Nickel and Nickel Alloys" *Kirk-Othmer Encyclopedia of Chemical Technology*, 3rd ed., vol. 15, 1981, pp. 787, 792.
Phillips Technical Review, vol. 40, 1982, No. 10, "Manufacture of Laser Video Discs by a Photopolymerization Process" Nikkei Mechanical, 1982, 2.1.

*Primary Examiner*—David A. Simmons
*Assistant Examiner*—Chester T. Barry
*Attorney, Agent, or Firm*—Birch, Stewart, Kolasch & Birch

[57] ABSTRACT

An optical recording disc which includes a pair of recording disc substrates opposed to each other with a space there between with a hub situated at the central portion of the disc substrates so that there is formed the closed space between the disc substrates, thereby providing a dual sided recordable optical recording disc. The hub may be formed by a pair of hub halves. There is disposed an annular inner spacer and annular outer space around the hub so as to separate the pair of recording disc substrates.

16 Claims, 9 Drawing Sheets

OPTICAL DISC MANUFACTURING METHOD

This application is a continuation of U.S. application Ser. No. 07/454,440 filed Dec. 21, 1989, now abandoned, which was a divisional application of U.S. application Ser. No. 07/122,186 filed Nov. 18, 1987, now U.S. Pat. No. 4,911,968 which in turn was a continuation-in-part of U.S. application Ser. No. 06/830,199 filed Feb. 18, 1986, now abandoned.

BACKGROUND OF THE INVENTION

1. Field of the Invention

The present invention relates to an optical disc and a process of making the optical disc.

2. Prior Art Discussion

Optical recording discs of the type accommodating a so called closed space are disclosed in European patent applications 0109245, and 0049813, and U. K. patent application 2087129. In the optical recording disc of the above type, a transparent disc substrate is disposed on the outermost part of the recording disc and a spindle insertion hole for receiving a rotation spindle of a disc player is defined in the transparent disc substrate.

German patent application 2624375 discloses an improved structure of the optical recording disc in which a central annular member acting as a hub and an outer annular member acting as an information recording substrate are assembled in one body by inserting the central annular member in the central opening of the outer annular member with a flange of the central annular member bonded with the outer annular member. In the arrangement, the spindle hole for receiving the spindle of the disc player is defined in the central portion of the central annular member. However, the German patent application 2624375 is directed to a single sided optical recording disc and does not disclose a dual sided optical recording disc. Moreover, there is not disclosed any way of alignment between the centers of the central annular member and the center of the outer annular member.

As the recording substrate it is required to use a material having a good optical property, such as glass without birefringence. In case the spindle insertion hole is opened in the glass recording substrate so that the glass recording substrate can contact a part of hub, there may occur a problem of breakage at the edge portion of the spindle hole.

In the optical recording disc of the type accommodating a closed space comprising two transparent recording substrates which are provided with the spindle insertion holes and separately opposed by an outer spacer and an inner spacer, each disposed at the outer peripheral portion and inner peripheral portion of the recording substrates, when the recording disc is rotated on the disc player by rotation of the spindle of the disc player, there will occur wearing of the peripheral wall of the recording substrate defining the spindle insertion hole and cracking at the bonded portions between the transparent recording substrate and spacer.

In the case of using a hub in the central portion of the transparent disc substrate, it is required that the hub use high abrasion resistance material against the rotational friction between the spindle of the disc player and transparent disc substrate. Moreover, in case a cut portion is formed in the inner peripheral edge of the transparent disc substrate for fitting the flange of the hub so that the flange portion of the hub is bonded to the transparent disc substrate, there may occur cracks in the transparent disc substrate.

SUMMARY OF THE INVENTION

An essential object of the present invention is to provide an optical disc of a dual sided recordable type with a high reliability during recording and playing back information and with a high productivity in a process of making the optical disc.

Another object of the present invention is to provide a dual sided recordable optical recording disc which is able to be manufactured without the problem of forming cracks in the recording disc substrate when the spindle insertion hole is opened in the optical recording disc.

A still further object of the present invention is to provide a dual sided recordable optical disc in which the problem of wear on the portions around the spindle insertion hole of the recording disc can be effectively eliminated.

In order to accomplish the objects mentioned above, according to the present invention, there is provided an optical recording disc which comprises a hub having a cylindrical member with a spindle insertion hole defined at the central portion of the cylindrical member and at least one flange coaxially formed on the cylindrical member with a diameter larger than the diameter of the cylindrical member so that the flange is projected from the cylindrical surface of the cylindrical member, a pair of transparent recording disc substrates each having an opening at the central portion thereof and a recording surface formed on one surface of the recording disc substrate, each transparent recording disc substrate being secured to the hub by inserting the hub into the opening of the transparent recording disc substrate in such a manner that the respective recording surface are opposed to each other, the pair of transparent recording disc substrates being bonded to the surface of the cylindrical member and the flange, and spaced by an outer spacer disposed at the outer peripheral edge portions of the transparent recording disc substrates so that a closed space is formed between the recording surfaces of the transparent recording substrates.

In the features of the optical disc according to the present invention mentioned above, since the spindle insertion hole is defined in the hub fitted to the transparent disc substrates, the problem of cracks and breakage of the disc substrate due to mechanical working at the opening of the spindle insertion can be avoided.

The hub may be made of metal so that wearing of the portions of the hub around the spindle insertion hole can be prevented.

The hub may be formed and processed independent of forming and processing of the disc substrate so that the hub may be made to a high degree of accuracy in size and an accurate alignment of the rotation center of recording tracks of the pair of disc substrates with the rotation center of the hub.

By employing the pair of recording disc substrates, the thickness of each substrate can be decreased and thus the weight of the optical recording disc also decreased, whereby it is possible for the optical recording disc to endure against the high speed rotation of the disc.

According to the present invention, the hub may be made of a pair of hub halves so that alignment of the rotation center of the recording tracks of the recording layers of the disc substrates and the rotation center of the hub of the optical recording disc can be made easily.

In case the hub is formed by the pair of hub halves, each assembly of the hub half and the disc substrate can be subjected to mechanical inspection to find any rotation fault, whereby it makes easy to manufacture the optical recording discs without any rotation fault.

In case the hub or hub half is provided with a flange, there may occur some difficulty in forming the flange which must be thin in thickness and small in the diameter of the flange. In order to eliminate this difficulty, according to the present invention, there is further provided an annular inner spacer around the flange of the hub. Since the inner peripheral edge portion of the disc substrates may be bonded to the inner annular portion of the spacer by means of bonding material, the mechanical strength of the disc substrates can be reinforced.

In the optical recording disc according to the present invention, the recording layers may be situated in the closed space, the holes for recording the information can be uniform with high accuracy, whereby the play back property may be improved.

The flange portions of the hub or hub halves may be situated outside the surface the optical recording disc so as to avoid contact of the spindle of the disc player with the the surface of the transparent disc substrate when the optical recording disc is loaded on the disc player, thereby preventing formation of scratches on the transparent disc substrate.

DETAILED DESCRIPTION OF THE PREFERRED EMBODIMENTS

Figure 1:
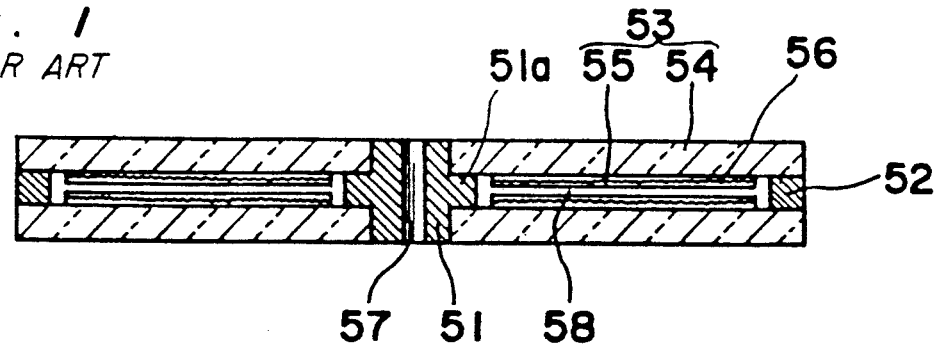
FIG. 1 is a sectional view of an embodiment of an optical disc according to the present invention.
Figure 2:
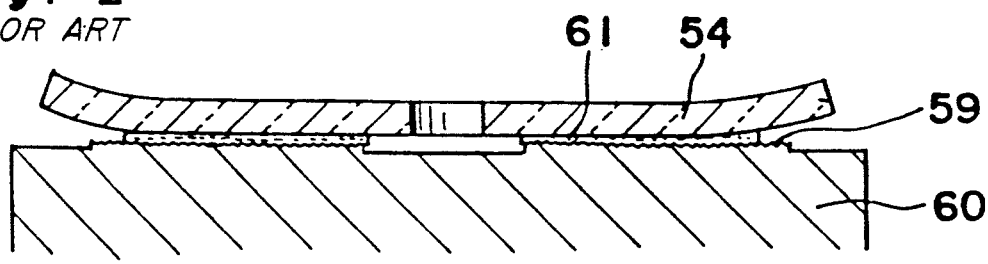
FIGS. 2 through 4 are sectional views showing a process of making the optical disc shown in FIG. 1.
Figure 3:
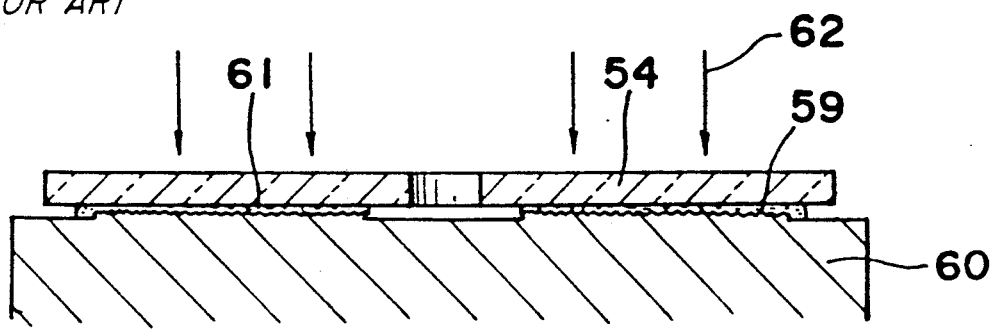
Figure 4:
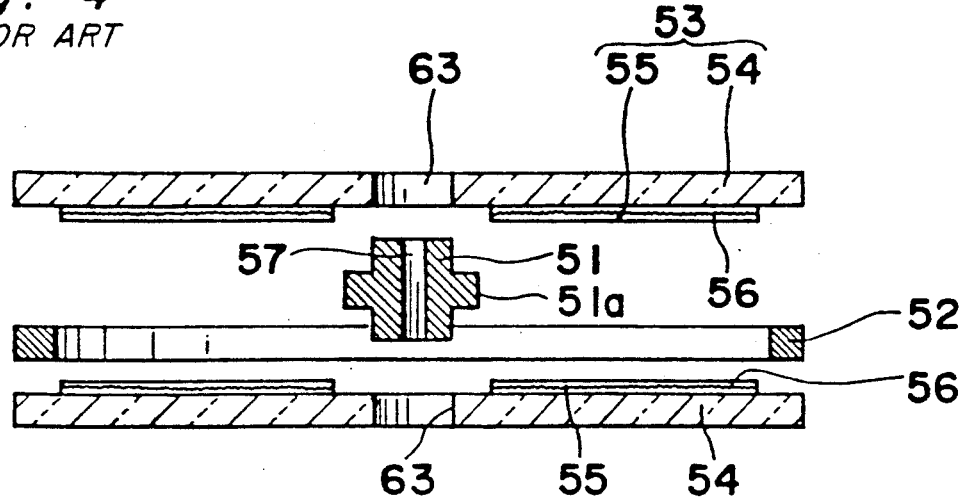

FIG. 1 is a sectional view of a dual sided recordable type of an optical disc made by a process shown in FIGS. 2 to 4. As shown in FIG. 1, two discs 53 are arranged through a hub 51 and an outer spacer 52 so that the disc 53 faces another disc 53. The disc 53 comprises a transparent disc substrate 54 and a recording layer 55 arranged on one side of the disc substrate 54, wherein a plurality of pregrooves and/or prepits 56 are formed on the recording layer 55, and the two disc 53 are arranged so that the recording layers 55 face one another.

On the other hand, the hub 51 is made of a material with an abrasion resistance characteristic, such as a metal, and a center hole 57 is formed at the center of the hub 51 in order to position the optical disc at a predetermined position by inserting a spindle of a disc drive device into the center hole 57 of the hub 51. In FIG. 1, there is a spacing 58 between the two recording layers 55 of the discs 53.

FIGS. 2 through 4 illustrate a process for making the dual optical disc shown in FIG. 1. First of all, as shown in FIG. 1, a resin layer 61 using an ultraviolet ray hardenable resin, having fluidity before being hardened, is coated on a stamper 60, on the surface of which a number of concentric or spiral grooves 59 corresponding to the pregrooves and/or prepits 56 are formed. The disc substrate 54 is pressed on the resin 61 with the proviso that the disc substrate 54 is curved so that the center portion of the substrate 54 is lower than the other portion of the substrate 54. That is, first, the center portion of the disc substrate 54 is pressed on the center of the stamper 60, and subsequently the outer portion of the disc substrate 54 is pressed on the resin 61 arranged on the stamper 60. By pressing the disc substrate 54 on the resin 61 as described above, the resin 61 arranged between the disc substrate 54 and the stamper 60 is spread toward the outer portion of the disc substrate 54 without any bubbles, and the resin 61 fills the grooves 59.

Then, ultraviolet rays are radiated toward disc substrate 54 in the direction of arrow 62, as shown in FIG. 3, thereby hardening the resin. Next, when the disc substrate 54 is exfoliated from the stamper 60, the hardened resin 61 is separated from the stamper 60 with the disc substrate 54. Then, the recording layer 55 is formed on the hardened resin 61 arranged on the disc substrate 54 by a vapor evaporation process, thereby the recording layer 55 with the pregrooves and/or prepits 56 is formed on the disc substrate 54. Then the replica process is completed.

The two disc substrates 54 are respectively constructed with a hub 51 and an outer spacer 52 by positioning the two disc substrates 54 in accordance with the formed pregrooves and/or prepits 56 so that the first disc substrate 54 faces the second disc substrate 54, thereby an optical disc is made, as shown in FIG. 1.

In the case of using the hub shown in FIG. 1, the thickness of the flange portion 51a of the hub 51 can be so selected that the flange portion 51a can be formed by mechanical cutting, whereby the flange can be made of relatively great thickness and it is possible to omit any spacer to be disposed between the disc substrates 54. However, the spacer may be fitted around the flange portion 51a, the diameter of which may be decreased, so as to separate the two disc substrates 54.

In the arrangement of the recording disc shown in FIG. 1, since the hub is assembled in common with the two disc substrates, undesired vibration of the disc under the high speed rotation can be prevented.

However, the aforementioned process has the following disadvantage. That is, it is difficult to arrange the center lines of the two disc substrates 54 on the center line of the hub 51 in a straight line, therefore the center lines of both disc substrates 54 are actually shifted from the center line of the hub 51. The shift between the center lines of both of the disc substrates 54 and the center line of the hub 51 decreases the reliability of the optical disc, and the constructing process, including the arranging process of the center line of both disc substrates 54 on the center line of the hub 51 in a straight line decreases the productivity of the whole manufacturing process of the optical disc.

That is, in general, the disc substrate 54 is made of a transparent substrate made of a polycarbonate resin, epoxy resin or glass, because the disc substrate 54 has to be transparent in order to write and read information to and from the recording layer 55 arranged on the disc substrate 54. On the other hand, in general, the hub 51 is made of metal, because the hub 51 has to be made of a material with abrasion resistance in order to set and take off the optical disc on and off a turn table of a recording and play back device repeatedly. Thus the coefficient of thermal expansion of the hub 51 made of the metal is nearly ten times larger than the coefficient of thermal expansion of the disc substrate 54. Therefore a clearance is undesirably formed between the disc substrate 54 and the hub 51 in order not to change the shape of the disc substrate 54 by the thermal expansion of the disc substrate 54. Also a clearance, is required in order to make the engagement between the disc substrate 54 and the hub 51 easy. When there is a clearance as described above, the relative shift between the center lines of the disc substrates 54 and the center line of the hub 51 easily occurs because of the clearance.

In the case where hub 51 is bonded on the disc substrate 54 with the proviso that the center line of the disc substrate 54 is slightly shifted from the center line of the hub 51, the optical disc is positioned by engaging the hub 51 in the spindle of a turntable of the recording and play back device, as described above, and the optical disc is arranged on the turntable and information is written and read in and from the optical disc, the pregrooves and/or prepits 56 arranged on the recording layer 55 rotate with the proviso that the center of the pregrooves and/or prepits 56 is slightly shifted from the rotation center of the optical disc. Therefore, the pregrooves and/or prepits 56 cannot track properly and the information included in the recording layer 55 of the optical disc cannot be written and read properly. Recently, the information has been recorded in the recording layer 55 of the optical disc at a higher density, wherein the width of the pregrooves and/or prepits 56 of the optical disc is very narrow, such as 0.4 μm–0.8 μm and the pitch between the pregrooves and/or prepits 56 of the optical disc is very short, such as about 1.6 μm. Therefore, a very small shift between the rotation center and the center of the pregrooves and/or prepits 59 directly influences the writing and reading characteristic of the optical disc.

In the process, it is necessary to bond the hub 51 on the disc substrate 54 by positioning the hub 51 very carefully using a microscope, and as a result, the bonding process decreases the productivity of the whole manufacturing process.

Figure 5:
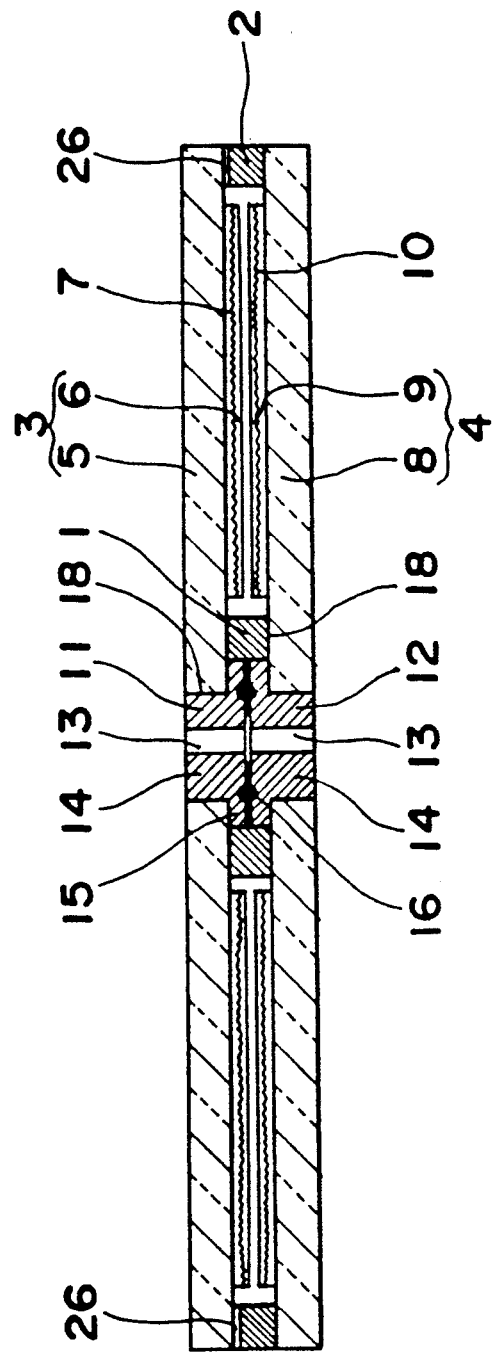
FIG. 5 is a sectional view of an optical disc of a first preferred embodiment according to the present invention.

FIG. 5 is a sectional view of a dual sided recordable type of an optical disc of a first preferred embodiment according to the present invention. In FIG. 5, a first disc 3 faces a second disc 4 through an inner spacer 1 and an outer spacer 2, each spacer having an annular shape. The first disc 3 comprises a first transparent disc substrate 5 and a first recording layer 6 arranged on one side of the first transparent disc substrate 5. First grooves and prepits 7 in a spiral or concentric shape are formed on the first recording layer 6. The second disc 4 comprising a second disc substrate 8, a second recording layer 9 arranged on the second disc substrate 8, and second grooves and prepits 10 on the second recording layer 9 is provided similar to the first disc 3.

Figure 6:
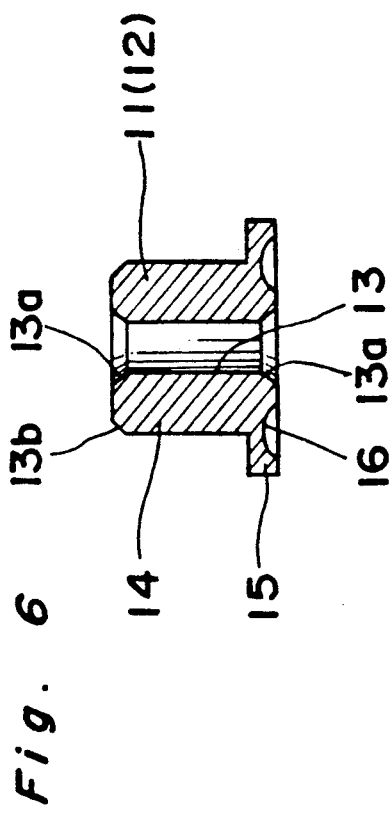
FIG. 6 is a sectional view of a cylindrical hub half of the optical disc shown in FIG. 5.

The two discs 3 and 4 are arranged so that the first recording layer 6 faces the second recording layer 9. A first hub half 11 is bonded at the center of the first disc substrate 5, and a second hub half 12 is bonded at the center of the second disc substrate 8. The hub halves 11 and 12 are made of a metal whose coefficient of thermal expansion is nearly equal to the disc substrates 5 and 8. For example, the hub halves 11 and 12 are made of an alloy of iron, nickel and chromium, containing nickel at 42 percent by weight and chromium at 6 percent by weight. As shown in FIG. 6, each of the hub halves 11 and 12 has the same shape and comprises a cylindrical portion 14 having a center hole 13 and an inner flange portion 15 in the shape of ring and arranged at the end of the cylindrical portion 14. The hub halves 11 and 12 are formed by processing an original member by a pressing process or a cutting process. A bonding recess 16 in an annular shape is formed in the end or inner surface or face of the inner flange portion 15, and the inner and outer rim portion of the cylindrical portion 14 of the hub halves 11 and 12 are chamferred at 13a and 13b.

Figure 7:
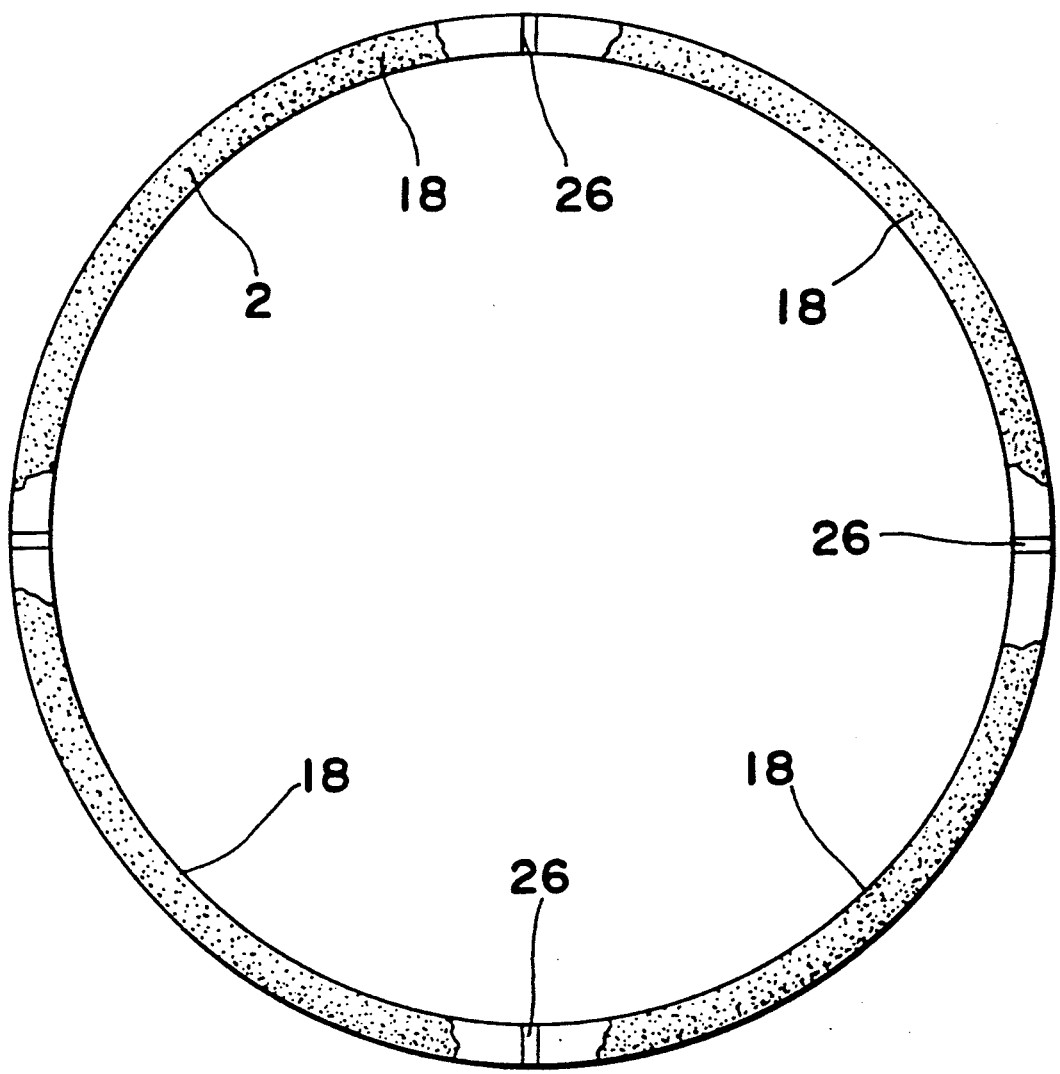
FIG. 7 is a plane view of an outer spacer of the optical disc shown in FIG. 5, FIGS. 8 (A) and 8 (B), and 9 through 12 are sectional views showing a process of making the optical disc shown in FIG. 5.

FIG. 7 is a plan view of the outer spacer. The outer spacer 2 and the inner spacer 1 are respectively made of a metal, such as stainless and aluminum etc., ceramics, or resin compositions, such as epoxy resin and polycarbonate resin. One or more grooves 26 for letting air out of the inside of the optical disc are formed on the upper surface of the outer spacer 2 so that grooves 26 pass through from the inside to the outside of the optical disc, as shown in FIG. 7.

Figure 8A:
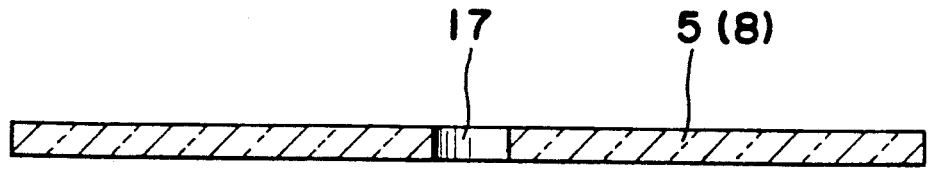
Figure 8B:
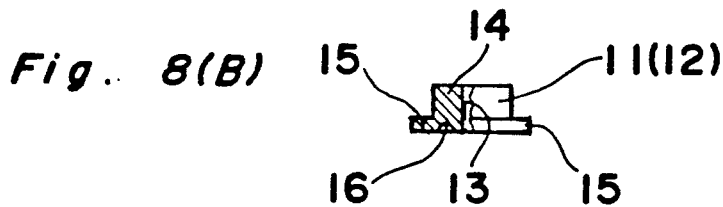
Figure 9:
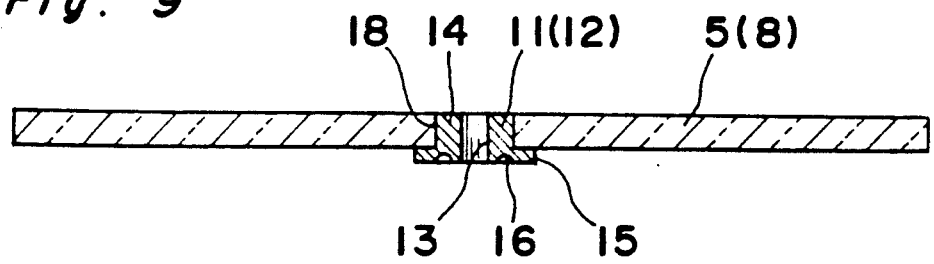

A process of making the optical disc will be described below, referring to FIGS. 8 through 12. First, a center hole 13 is formed precisely at the center of the hub half 11, as shown in FIG. 8 (B), and a through hole 17 is formed at the center of the surface of the disc substrate 5, as shown in FIG. 8 (A). Second the upper surface of the inner flange portion 15 and the outer rim surface of the cylindrical portion 14, of the hub half 11, are coated with a bonding material 18, and then the cylindrical portion 14 is inserted into a through hole 17 of the disc substrates 5, thereby the hub half 11 is bonded on the disc substrate 5, as shown in FIG. 9. For example, a transparent bonding material such as an ultraviolet ray hardenable resin, etc. is used as the bonding material 18, because the transparent bonding material 18 will not adversely influence the appearance of the optical disc.

Figure 10:
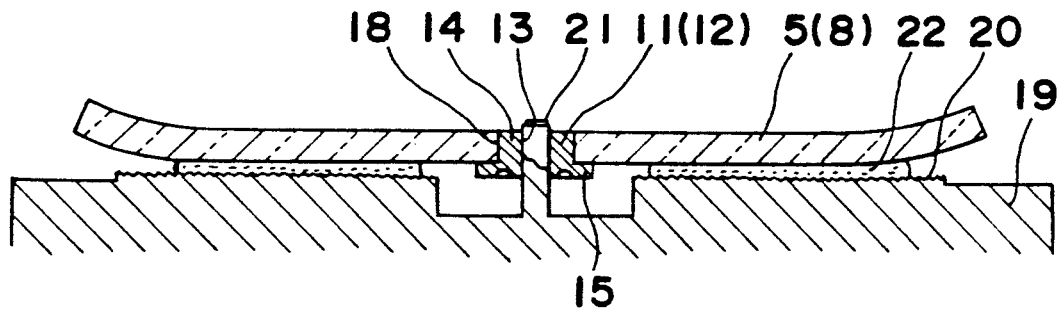

As shown in FIG. 10, there is provided a stamper 19 having concentric or spiral grooves 20 corresponding to the pregrooves and/or prepits 7. The grooves 20 are formed on the upper surface of the stamper 19 with a positioning pin 21 projected from the surface of the stamper 19 at the center of the stamper 19, to position the disc substrate 5 on the stamper 19. A predetermined quantity of the fluidity ultraviolet ray hardenable resin is coated on the surface of the stamper 19. Then, the disc substrate 5 with the hub half 11 is pressed on the stamper 19.

As shown in FIG. 10, the disc substrate 5 is placed on the surface of the stamper 19 with the proviso that the disc substrate 5 is curved so that the center portion of the disc substrate 5 is lower than the outer portion of the disc substrate 5. The positioning pin 21 is inserted into the center hole 13 of the hub half 11, thereby making it possible to position the disc substrate 5 on the surface of the stamper 19. The disc substrate 5, so curved and positioned, is pressed on the surface of the stamper 19 and the ultraviolet ray hardenable resin 22 is spread toward the outer portion without the formation of bubbles. The fluid resin 22 is flowed into and fills the grooves 20.

Figure 11:
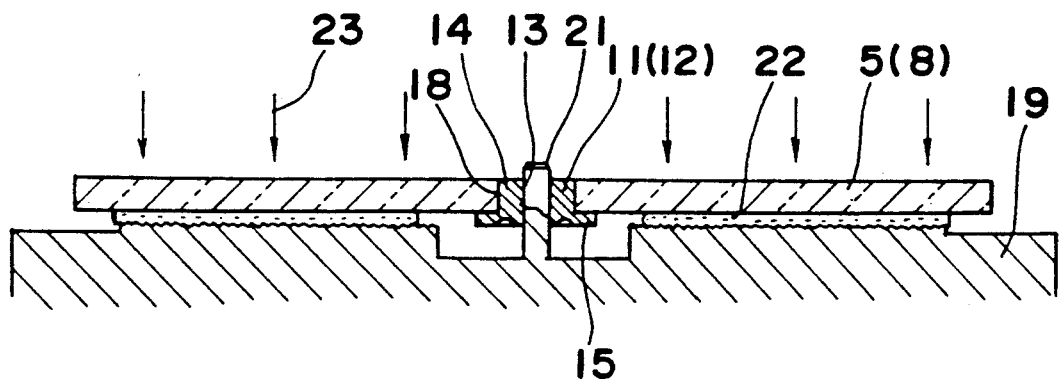
Figure 12:
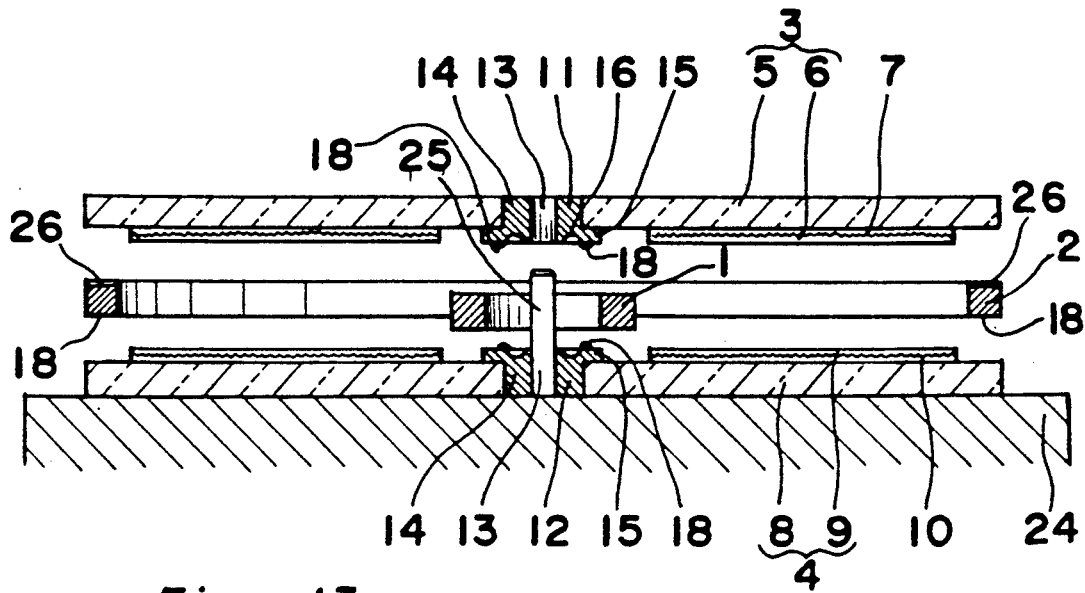

Subsequently, as shown in FIG. 11, the disc substrate 5 is radiated uniformly by ultraviolet rays, while being pressed on the surface of the stamper 19, thereby hardening resin 22, which has been applied between the stamper 19 and the disc substrate 5. Next, the disc substrate 5 is exfoliated from the stamper 19 with the hardened resin 22 layer attached onto the surface of disc substrate 5 resulting in a transparent resin layer with the pregrooves and/or prepits 7 and the prepits not shown.

The disc substrate 5 with the transparent resin layer 22 is positioned in a vacuum vapor evaporation device, which is a vacuum evaporator. Recording layer 6 is formed on the surface of the transparent resin layer 22 by a known vapor evaporation method. A metal with high optical reflectivity, such as aluminum or an alloy of tellurium, selenium and lead, etc., is used as the recording layer 6.

On the other hand, another disc 4 comprising the hub half 12, the disc substrate 8 and the recording layer 9 with the pregrooves and/or prepits 10 is made by the same process as the process of the disc 3 discussed above.

After the disc 3, comprising the recording layer 6 arranged on the transparent resin layer 22, and the disc 4, comprising the recording layer 9 positioned on the transparent resin layer 22, are made by the aforementioned replica process, the second disc 4 is positioned on the base stand 24 by inserting the center pole 25 positioned on the upper surface of the base stand 24 into the center hole 13 of the second hub half 12.

Next, the bonding material 18 is coated in and near the bonding recess 16 of the second hub half 12, then the inner spacer 1 and the outer spacer 2, whose top and bottom surfaces are coated with the bonding material 18, are arranged at a predetermined position of the disc 4. When the inner spacer 1 is so arranged, the inner spacer 1 is positioned by engaging the inner spacer 1 with the flange portion 15 of the second hub half 12. The bonding material 18 is not coated at or near the pregrooves 26 on the surface of the outer spacer 2 on which the grooves 26 are formed, in order not to close the grooves 26 with the bonding material 18.

Then, the first disc 3 comprising the first hub half 11, whose bottom surface is coated with the bonding material 18, is positioned on the inner spacer 1 and the outer spacer 2, and the center pole 25 is inserted into the center hole 13 of the first hub half 11. Thereby, the first disc 3 and the second disc 4 are positioned at the proper position, and the hub halves 11 and 12 of the two discs 3 and 4, the inner spacer 1 and the outer spacer 2 are bonded as one body. As a result, the optical disc is made as shown in FIG. 5.

The optical disc described above has spacings, which are the grooves 26 for letting air out of the inside of the optical disc, positioned between the outer spacer 2 and the disc substrate 5. The grooves 26 are useful for letting the gas, which evolved when the bonding material 18 is being firmed, out of the inside of the optical disc to the outside of the optical disc. The gas is preferably exhausted, because the gas causes recording layers 6 and 9 to change in quality when the gas evolves during the period when bonding material 18 is being firmed, i.e. the mainly organic dissolving material remains in the inside of the optical disc. After bonding material 18 is firm, grooves 26 are closed and the inside of the optical disc is made airtight.

Figure 13:
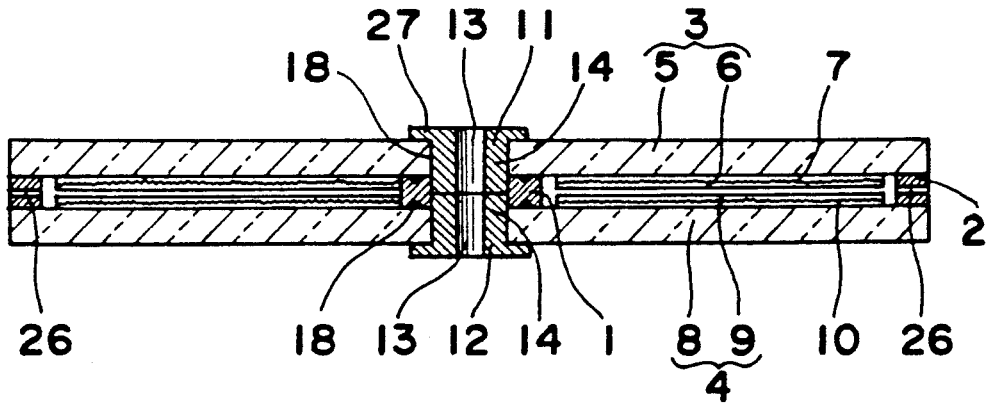
FIG. 13 is a sectional view of an optical disc of a second preferred embodiment according to the present invention.
Figure 14:
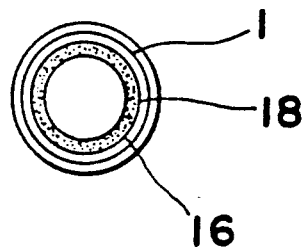
FIG. 14 is a plan view of an inner spacer of the optical disc shown in FIG. 13, FIGS. 15 and 16 are sectional views showing a process of making the optical disc shown in FIG. 13.
Figure 15:
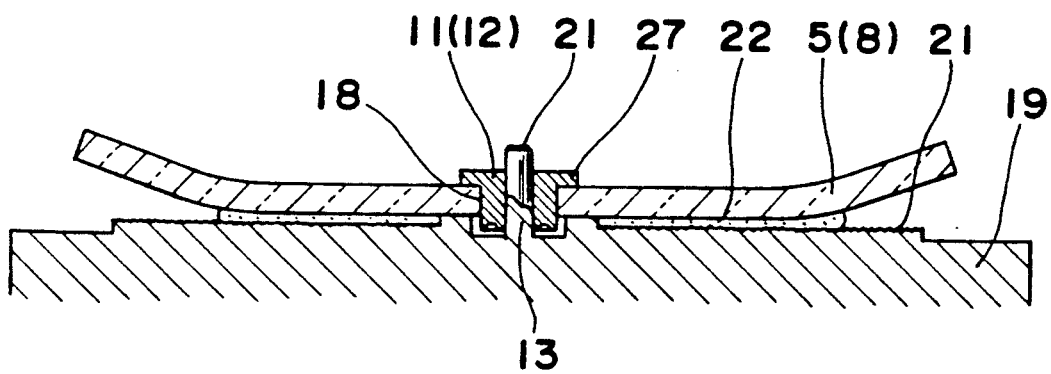
Figure 16:
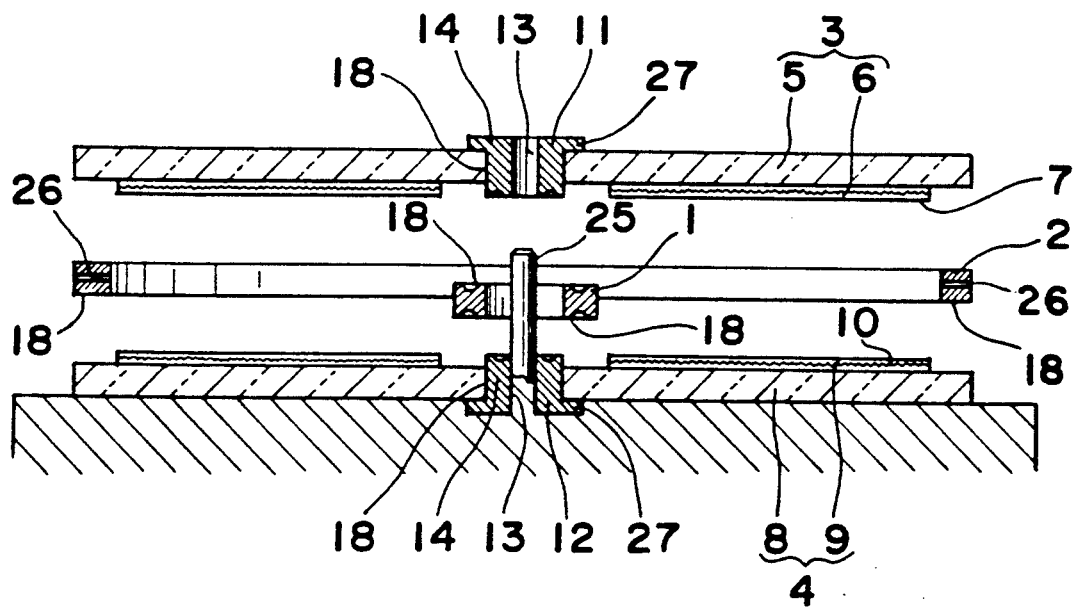

FIG. 13 is a sectional view of an optical disc of a second preferred embodiment, FIG. 14 is a plan view of an inner spacer used for the optical disc shown in FIG. 13, and FIGS. 15 through 16 are a sectional views showing a process for making the optical disc shown in FIG. 13.

In FIG. 13, the first hub half 11 and the second hub half 12 comprise a cylindrical portion 14 having a center hole 13 processed precisely and an outer flange portion 27, respectively. The first hub half 11 and the second hub half 12 of the optical disc of the second preferred embodiment are made of an alloy of iron, nickel and chromium, containing nickel at 42 percent by weight and chromium at 6 percent by weight. As shown in FIGS. 13 through 15, the bottom surface of the outer flange portion 27 and the outer surface of the cylindrical portion 14 are coated with the bonding material 18, then the first hub half 11 is bonded on the first disc substrate 5 as one body by inserting the cylindrical portion 14 of the hub half 11 into the center hole of the first substrate 5. On the other hand, the second hub half 12 is bonded on the second disc substrate 8 as one body by inserting the cylindrical portion 14 of the hub half 12 into the center hole of the second disc substrate 8.

In the optical disc of the second preferred embodiment, bonding recesses 16 in the shape of a ring are formed on the top and bottom surface of the inner spacer 1. One and more grooves 26, used for letting the gas out of the inside of the optical disc, are formed at the middle position in the axial direction so that the grooves 26 pass through from the inside to the outside of the optical disc. Arranging the grooves 26 at the middle position in the axial direction prevents the bonding material 18 described below from closing the grooves 26.

The process of making the optical disc of the second preferred embodiment will be described below. First, the hub half 11 is bonded at the center portion of the disc substrate 5 on which the recording layer 5 is not formed. In FIG. 15, the stamper 19 comprises concentric or spiral grooves 21, corresponding to the pregrooves and/or prepits 7, and a positioning pin 21 is arranged at the center of the grooves 20 and projected from the surface of the stamper 19. As shown in FIG. 15, the aforementioned disc substrate 5 comprising the hub half 11 is positioned on the stamper 19 by inserting the positioning pin 21 into the center hole 13 of the hub half 11 of the disc 3, with the proviso that the disc substrate 5 with the hub half 11 is curved so that the center portion of the disc substrate 5 becomes lower than the other portion of the disc substrate 5.

Next, the disc substrate 5 is pressed completely on the stamper 19, then the ultraviolet rays radiate toward the upper surface of the disc substrate 5 whereby the ultraviolet rays cause resin 22, which is layered between the disc substrate 5 and stamper 19, to be hardened by the ultraviolet rays. Then, disc substrate 5, comprising the hub half 5 and the hardened resin 22, are exfoliated from the stamper 19. Afterwards, the disc substrate 5 comprising the hub half 5 and the resin 22 is positioned in a vacuum vapor evaporation device, and the recording layer 6, made of metal with high optical reflectivity, is formed by the same vapor deposition method as the method of the optical disc of the first preferred embodiment.

On the other hand, another disc 4 comprising a disc substrate 8, a recording layer 9 with pregrooves and/or prepits 10 and a hub half 12 is made by the same process as the above described process for the disc 3.

As shown in FIG. 16, the second disc substrate 4 is positioned on the base stand 24 so that the center pole 25 is inserted into the center hole 13 of the second hub half 12. Then, inner spacer 1 and outer spacer 2, whose top and bottom surfaces are coated with the bonding material 18, are arranged at the predetermined position of the disc 4, thereby the inner spacer 1 is positioned at the predetermined position by engaging the inner spacer 1 in the outer surface of the cylindrical portion of the second hub half 12. Then, the first disc 3 is arranged on the inner spacer 1 and the outer spacer 2 so that the center pole 25 is inserted into the center hole 13 of the first hub half 11, thereby the first disc 3 and the second disc 4 are positioned at the predetermined proper position so that the center of the first disc 3 corresponds to the center of the second disc 4, and the two discs 3 and 4, and the inner spacer 1 and outer spacer 2 are bonded as one body. As a result, the optical disc of the second preferred embodiment shown in FIG. 13 is made.

Figure 17:
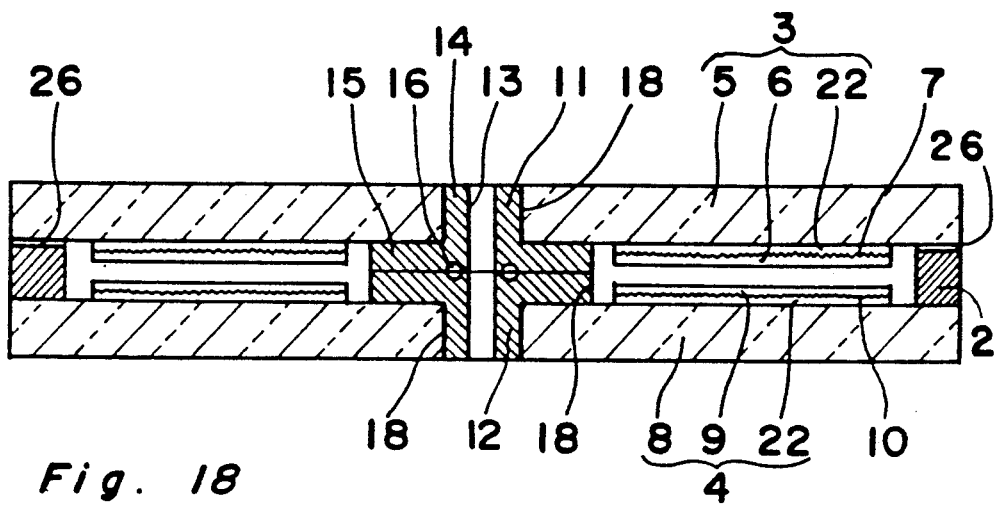
FIG. 17 is a sectional view of an optical disc of a third preferred embodiment according to the present invention.

FIG. 17 is a sectional view of an optical disc of a third preferred embodiment according to the present invention, in which the inner spacer 1 used in the optical discs of the first and second preferred embodiments is omitted. In the optical disc shown in FIG. 17, each of the disc halves 3 and 4 is provided with a hub half 11 which is similar to the hub half 11 ( or 12 ) of the optical disc of the first and second preferred embodiments, except that the diameter of the flange portion 15 is larger than that of the hub half 11 (or 12). In the case of the hub half 11 with the large diameter flange 15 the flange can serve as the inner spacer to support the substrates 5 and 7. Thus, there is no need to use the separate inner spacer 1.

In FIG. 17, the outer surface of the cylindrical portion 14 and the inside surface of the flange portion 15 of the hub half 11, which is not the end surface, and the inner surface and the outer surface of the flange portion 15, are coated with the bonding material 18. Then the cylindrical portion 14 of the two cylindrical hub halves 11 and 12 is inserted into the center hole of the disc substrates 5 and 8, respectively, thereby the cylindrical hub half 11 is bonded on the disc substrates 5 and 8, respectively. After that, the recording layers 6 and 9 are formed on one side surface of disc substrates 5 and 8 comprising the hub halves 11 and 12 made, as described above, by the same process as the process of the optical discs of the first and second preferred embodiments, respectively. After the bottom surfaces of the flange portion 15 of the two hub halves 11 and 12, facing each other, are coated with the bonding material 18, the outer spacer 2 is positioned on the outer rim portion between one side surface of disc substrates 3 and 8. The optical disc of the third preferred embodiment is constructed so that recording layer 6 faces recording layer 9, as well as the optical discs of the first and second preferred embodiments. FIG. 17 shows the sectional view of the constructed optical disc of the third preferred embodiment. The optical disc of the third preferred embodiment has the two advantages described below. That is, one advantage is a simplification of the manufacturing process because it is not necessary to bond the inner spacer 1 onto disc substrates 5 and 8 with bonding material 18. Another advantage is that the first disc 3 is bonded more strongly to the second disc 4 than the optical discs of the first and second preferred embodiments comprising the inner spacer 1, because the bonding area of the optical disc of the third preferred embodiment is wider than the bonding area of the optical discs of the first and second preferred embodiments.

Figure 18:
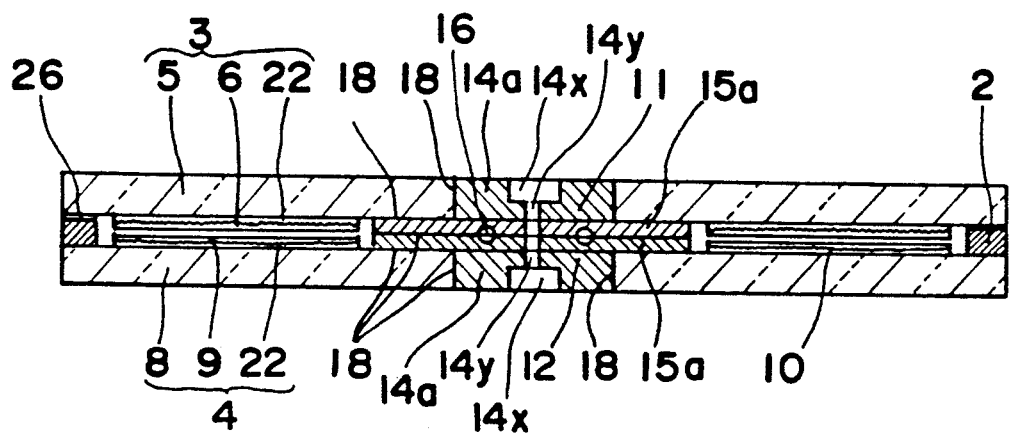
FIGS. 18 and 19 are sectional views of optical disc of a fourth preferred embodiment according to the present invention.
Figure 19:
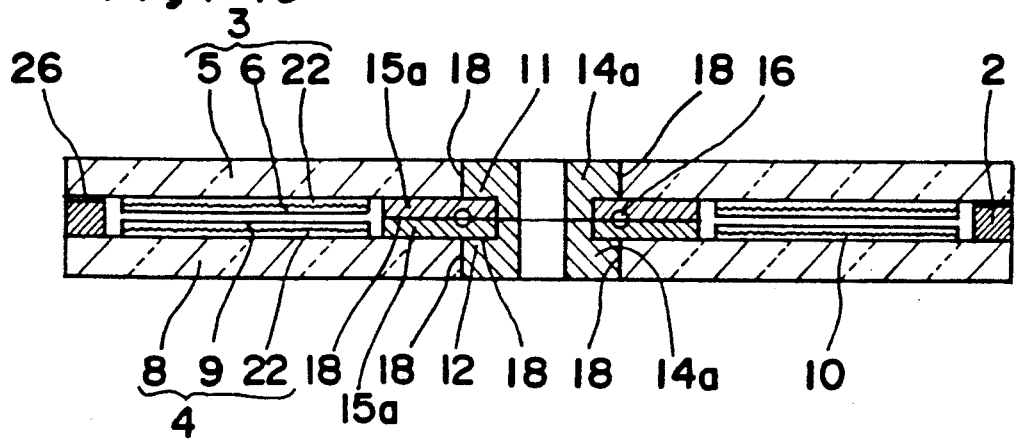

FIGS. 18 and 19 are sectional views of the optical disc of the fourth preferred embodiment. In the fourth preferred embodiment, each of hub halves 11 is formed by a flange body 15a and a cylindrical body 14a, each body being a separate member. The two flange bodies 15a and the two cylindrical bodies 14a are made respectively, so that the outer diameter of the flange body 15a is larger than the outer diameter of the flange portion 15 of the cylindrical hub half 11 of the optical disc of the third preferred embodiment shown in FIG. 17. Then flange body 15a is bonded on the end surface of the cylindrical body 14a with the bonding material 18. Flange body 15a may be coupled with the cylindrical body 14a by being welded or screwed. Thus, the cylindrical hub half 11, comprising the cylindrical body 14a and the flange body 15a, can be made.

In the process of making the optical disc of the fourth preferred embodiment, after the two cylindrical hub halves 11 and 12 are made and the surfaces of the hub halves 11 and 12 are coated with bonding material 18, similar to the hub halves 11 and 12 of the optical disc of the third preferred embodiment, the cylindrical body 14a of the hub half 11 is inserted into the center hole of the disc substrate 5 of the first disc 3, and the cylindrical body 14a of another hub half 11 is inserted into the center hole of the disc substrate 8 of the second disc 4. After the end surfaces of the flange bodies 15 of the two hub halves 11 and 12 are coated with the bonding material, the first disc 3 and the second disc 4 are connected together as one body with the outer spacer 2, so that the end surface of the cylindrical body 15a of one hub half 11 is bonded onto the end surface of the cylindrical body 14a of another hub half 12 and the recording layer 6 formed on the disc substrate 5 faces the recording layer 9 formed on the disc substrate 8, thereby the optical disc of the fourth preferred embodiment shown is made without the inner spacer 1.

In the optical disc of the fourth preferred embodiment, the bonding area between the flange body 15a and the disc substrates 3 or 4 and between the cylindrical body 14a and the disc substrates 3 or 4 are wider than the bonding area of the optical disc of the third preferred embodiment shown in FIG. 17, because the outer diameter of the flange body 15a is greater than the outer diameter of the flange portion 15 of the hub half 11 shown in FIG. 17. The flange portion 15 of the hub half 11, with such a large outer diameter as the flange body 15a and shown in FIGS. 18 and 19, cannot be formed by punching a plate. The flange portion 15 of the hub half 11, e.g. whose thickness is 0.3 mm, is formed by a cutting process. Therefore, the first disc 3 can be bonded more strongly through the two flange bodies 15a to the second disc 4 than the optical disc shown in FIG. 17. The optical disc of the fourth preferred embodiment can be rotated at high speeds, such as 1200-3600 rpm and it is also possible to access the optical disc at a high speed rate.

Figure 20:
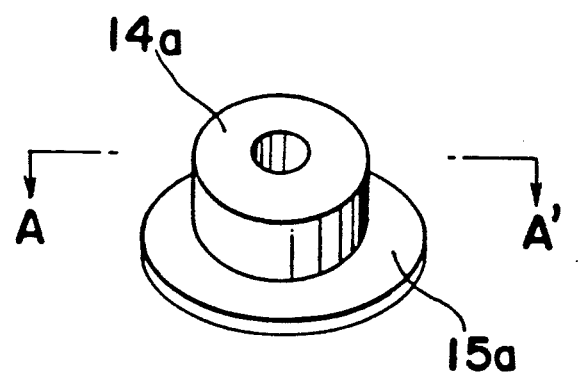
FIG. 20 is a perspective view of a hub half body of the optical disc shown in FIG. 18.
Figure 21:
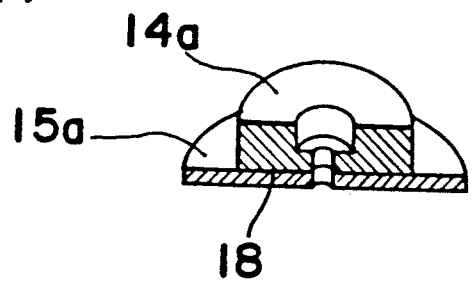
FIG. 21 is a perspective sectional view of the hub half body along the line of A—A' shown in FIG. 20.

FIG. 18 is the sectional view of one of the optical discs of the fourth preferred embodiment. In FIG. 18, each of the hub halves 11 and 12 is composed of a first cylindrical body 14a of a small diameter and a second cylindrical body 15a of a large diameter acting as the flange body 15a. The cylindrical bodies 14a and 15a are molded individually and are bonded together to provide the hub halves 11 and 12 as shown in FIG. 20. There are defined, in the hub halves 11 and 12, a first hole 14x having a relatively large diameter enough to receive a standard pin of a recording and playing back device and a second hole 14y of a small diameter to provide a main cylindrical portion and a sub cylindrical portion. The end surface of the main cylindrical portion of the first cylindrical body 14a is bonded on the second cylindrical body 15a whose inner diameter is equal to the diameter of the hole 14y of the main cylindrical portion of the first cylindrical body 14a. The outer diameter of the flange body 15a is larger than the outer diameter of the second cylindrical portion 15 of the hub half 11 shown in FIG. 17, thereby, the bonding area between the disc substrates 3 or 4 and the end surface of the second cylindrical body 15a is wider than the bonding area between the disc substrate 3 or 4 and the flange portion 15 of the cylindrical hub half 11 shown in FIG. 17. Also the bonding area of both second cylindrical bodies 15a shown in FIG. 18 is wider than the bonding area of the second cylindrical portions 15 of the hub half 11 shown in FIG. 17. Therefore, two disc substrates 5 and 8 can be bonded together strong through the flange bodies 15a and the outer spacer 2, as shown in FIG. 18.

Figure 22:
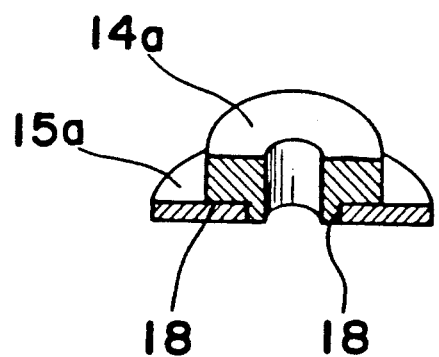
FIG. 22 is a perspective sectional view of a hub half body of the optical disc shown in FIG. 19.

FIGS. 19 and 22 show a modification of the hub half body of the optical disc of the fourth preferred embodiment. In FIGS. 19 and 22, the cylindrical hub half body 14a comprises a main cylindrical portion and a sub cylindrical portion, wherein the outer diameter of the sub cylindrical portion is shorter than the outer diameter of the main cylindrical portion of the cylindrical body 14a and the inner diameter of the sub cylindrical body is equal to the inner diameter of the main cylindrical portion, and the thickness of the flange body 15a is equal to the axial length of the sub cylindrical portion. The sub cylindrical portion is inserted into the central hole of the flange body 15a and the flange body 15a is bonded to the cylindrical body 14a, so that the inner surface of the flange body 15a faces the outer surface of the sub cylindrical portion of the cylindrical body 14a, thereby the cylindrical hub half body 11 is constructed.

Figure 23:
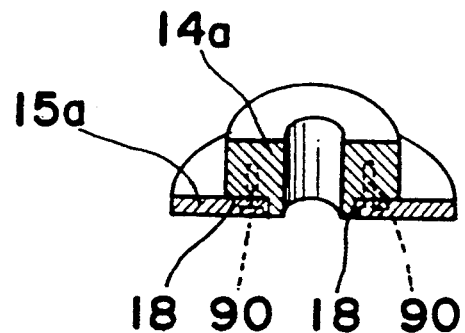
FIG. 23 is a perspective sectional view of a hub half body constructed by screwing and bonding a flange portion on a cylindrical portion.

FIG. 23 is a perspective sectional view of a screwed hub half body of the cylindrical body 14a and the flange body 15a of the optical disc shown in FIG. 19. The flange body 15a may be screwed and bonded on the cylindrical body 14a with one or more screws 90 as shown in FIG. 23, and also the flange body 15a may be only screwed on the cylindrical body 14a.

According to the fourth preferred embodiment shown in FIGS. 18 and 19, the optical disc has the advantage that it is possible to adjust the length of the flange of the flange body 15a corresponding to the outer diameter minus the inner diameter of the flange body 15a, so that the optical disc has a required mechanical strength, whereby it can be accessed at high speed.

The bonding recess 16 may be formed on the end surface of the flange portion 15 of the cylindrical hub half 11 shown in FIG. 17, or the end surface of the flange body 15a shown in FIGS. 18 and 19, which are facing each other.

Figure 24:
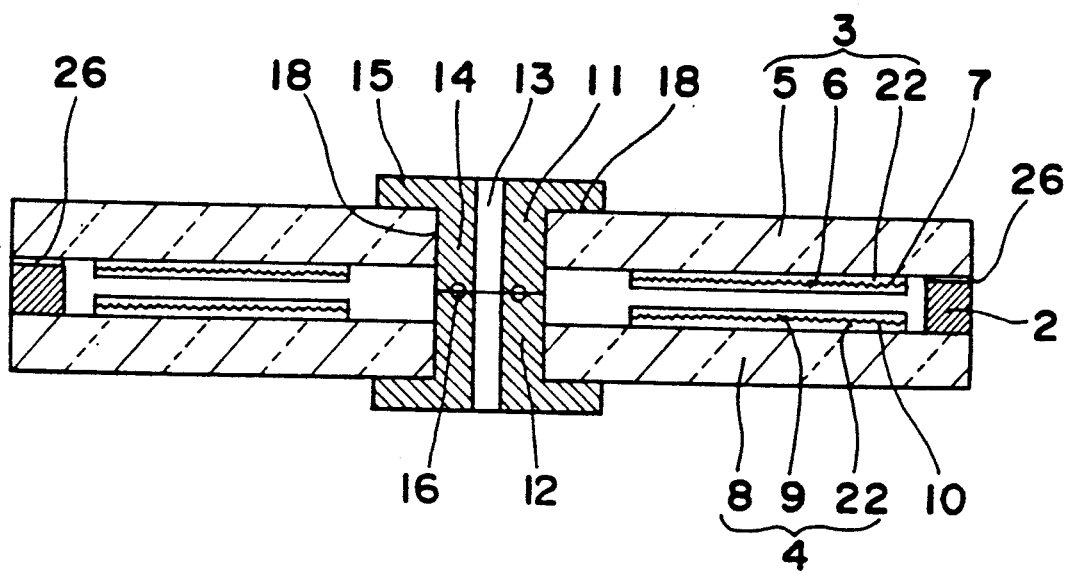
FIG. 24 is a sectional view of an optical disc of a fifth preferred embodiment according to the present.

FIG. 24 shows an optical disc of a fifth preferred embodiment according to the present invention, comprising two cylindrical hub halves 11 and 12 having a cylindrical portion 14 and a flange portion 15 arranged on the end surface of the cylindrical portion 14. In FIG. 24, the end surface of the cylindrical portion 14 of the hub half 11, where the flange portion 15 is not formed, is bonded on the the end surface of the cylindrical portion of another hub half 12 and another inside surface of the flange portion 15 of the cylindrical hub halves 11 and 12 is bonded on the outer surface of the disc substrates 5 and 8, respectively. The outer surfaces of the cylindrical portions 14 of the hub halves 11 and 12 are bonded on the inner surfaces of the center holes of the disc substrates 5 and 8, respectively. As shown in FIG. 24, as the flange portion 15 of the cylindrical hub half 11 is arranged at the outside of the optical disc, an adapter arranged on the turn table is required when the optical disc is set on the turn table. However, the coefficient of friction between the turn table and the optical disc becomes greater than the aforementioned optical disc, such as the optical discs of the first, third and fourth preferred embodiments shown in FIGS. 5, 17, 18 and 19, because the outside area of the hub half 11 shown in FIG. 24 is wider than the outside area of the hub half 11 shown FIGS. 5, 17, 18 and 19. Therefore, the optical disc shown in FIG. 24 can be accessed at high speed.

Figure 25:
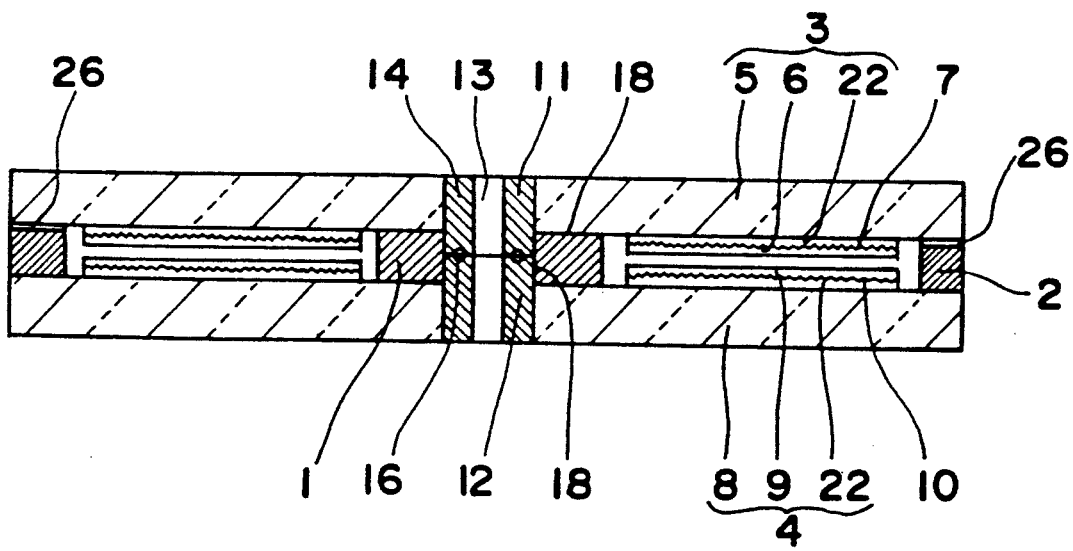
FIG. 25 is a sectional view of an optical disc of a sixth preferred embodiment according to the present invention.

FIG. 25 shows an optical disc of a sixth preferred embodiment according to the present invention, comprising an inner spacer 1 and two cylindrical hub halves 11 and 12 without a flange portion. In FIG. 25, the outer surface of the two cylindrical hub halves 11 and 12 are bonded on the inner surface of the inner spacer 1, and the top and bottom surfaces of the inner spacer 1 are bonded on the disc substrates 5 and 8 respectively, thereby the inner spacer 1 acts as well as the flange portion 15 of the cylindrical hub half 11 of the optical discs of the third and fourth preferred embodiments. That is, bonding among the inner spacer 1, the disc substrates 5 and 8, and the cylindrical hub halves 11 and 12 can improve the bonding intensity between the disc substrates 5 and 8.

The pregrooves and/or prepits provided in the optical disc for recording may be formed in a spiral or concentric shape.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A process of making an optical disc comprising the steps of:

arranging a first hub half having a center hole at the center of a first disc substrate, arranging a second hub half having a center hole at the center of a second disc substrate, forming a first layer having at least tracking information on said first disc substrate by using a center portion of said first hub half as a reference point arranging a spindle projected from a surface of a stamper, forming a second layer having at least tracking information on said second disc substrate by using a center portion of said second hub half as a reference point arranging a spindle projected from a surface of a stamper, forming a first recording layer and a second recording layer respectively on each of said first and second layers having tracking information thereon, positioning said first and second disc substrates by using said center holes of said first and second hub halves making said first disc substrate face said second disc substrate so that said first recording layer faces said second recording layer, and constructing said first substrate with said first hub half and said second substrate with said second hub half as one body.

2. A process of making an optical disc comprising the steps of:

producing a first optical disc including a first transparent substrate having a first rotation central hole defined at the center of said first transparent substrate, a first hub half having a central hole with a rotation center and a first projected portion joined to a first inner surface of said first transparent substrate with a first cylindrical portion of said first hub half projecting through said first rotation central hole juxtapositioned to a second surface of said first transparent substrate circumscribing said first rotation central hole, said rotation center of said first hub half central hole accurately coinciding with said first rotation central hole of said first transparent substrate, producing a second optical disc including a second transparent substrate having a second rotation central hole defined at the center of said second transparent substrate, a second hub half having a central hole with a rotation center and a second projected portion joined to a first inner surface of said second transparent substrate with a second cylindrical portion of said second hub half projecting through said second rotation central hole juxtapositioned to a second surface of said second transparent substrate circumscribing said second rotation central hole, said rotation center of said second hub half central hole accurately coinciding with said second rotation central hole of said second transparent substrate, providing at least one recording layer for recording tracking signals on at least one surface of said first transparent substrate and said second transparent substrate, arranging said first optical disc with respect to said second optical disc such that a central axis of tracking coincides with a central axis of said first rotation central hole of said first hub half of said first substrate and a central axis of said second rotation central hole of said second hub half of said second substrate, bonding an outer surface of said projected portion of said first hub half of said first optical disc and an outer surface of said projected portion of said second hub half of said second optical disc, engaging a ring like inner spacer having an inner cylindrical surface with outer peripheral sides of said first projected portion of said first hub half and said second projected portion of said second hub half, and bonding said inner cylindrical surface of said ring like inner spacer to said projected portions of said first hub half and said second hub half, and bonding a first end surface of said inner spacer of said surface of said first transparent substrate and a second end surface of said inner spacer to said surface of said second transparent substrate.

3. The process of claim 2, further including the step of arranging said first optical disc having a first recording layer on said surface of said first transparent substrate and said second optical disc having a second recording layer on said surface of said second transparent substrate so as to coincide with said central axis of tracking of said recording layers, said central axis of said first rotation central hole of said first hub half of said first substrate and said central axis of said second rotation central hole of said second hub half of said second substrate.

4. The process of claim 2, wherein said inner spacer is made of an alloy of iron, nickel and chromium, containing nickel at 42 percent by weight and chromium at 6 percent by weight.

5. The process of claim 2, wherein said bonding is realized by an ultraviolet light hardening material.

6. The process of claim 2, wherein a ring like aluminum outer spacer is provided between the outer periphery of each of said first and second optical discs.

7. A method of producing an optical recording disc comprising the steps of:

providing a stamper having at least prepits and/or pregrooves formed on a surface thereof including a positioning pin projected from a center of said surface, an axial center of said pin coinciding with a tracking center and a rotation center of said optical disc, coating an ultraviolet-hardenable resin layer on said surface of said stamper over said prepits and/or pregrooves, providing a transparent disc substrate having a surface with a through hole formed at a center thereof, providing a hub comprising a central hole and a cylindrical portion, said hub having a flange portion as an outer extension of said cylindrical portion, said central hole being arranged at a center of said cylindrical portion, inserting said hub into said through hole of said disc substrate such that said flange portion and an outer rim surface of said cylindrical portion of said hub bonds said hub to said disc substrate, positioning said disc substrate over the resin layer coated surface of said stamper by inserting said positioning pin of said stamper into said central hole of said hub, uniformly radiating said transparent disc substrate with ultraviolet radiation while said disc substrate is positioned on said surface of said stamper thereby hardening said resin, exfoliating said hub and said transparent disc substrate from said stamper whereby said hardened resin layer separates from said stamper with said disc substrate, said hardened resin layer comprising a surface of pregrooves and/or prepits, and forming a recording layer on said surface of said hardened resin layer over said pregrooved and/or prepitted surface.

8. The method of claim 7, wherein the diameter of said central hole of said hub of said substrate is such that said positioning pin of said stamper for forming a replica layer is tightly engaged in said hole, with the central axis of said hole being coaxial with the center of the track of said stamper.

9. The method of claim 7, wherein said transparent recording disc substrate is made of glass and said hub is made of an alloy of iron, nickel and chromium, containing nickel at 42 percent by weight and chromium at 6 percent by weight.

10. The method of claim 7, wherein said hub is made of material having a thermal expansion coefficient similar to that of the material of said transparent recording disc substrate.

11. A method of producing a dual optical recording disc by combining together first and second optical recording discs prepared according to the method of claim 7.

12. The method of claim 11, wherein respective holes of a first hub and a second hub are coaxial with a tracking axis of a first track of a first substrate and a tracking axis of a second track of a second substrate.

13. The method of claim 11, wherein a hole of a first hub of a first substrate and a hole of a second hub of a second substrate are connected and cylindrical walls of said first and second hubs defining said holes are smoothly connected.

14. The method of claim 11, wherein a recording layer is formed on each of first and second substrates in such a manner that a rotation center of a hole of first and second hubs is used as a tracking center of pregrooves of said recording layers.

15. The method of claim 11, wherein a projected portion of a first hub of a first transparent substrate and a projected portion of a second hub of a second transparent substrate form flanges of the respective first and second hubs.

16. The method of claim 11, wherein first and second hub halves are connected as one body.

* * * * *